June 14, 1960
S. P. POSTMA
2,940,546
RAILWAY HAND BRAKE LINKAGE
Filed May 7, 1957
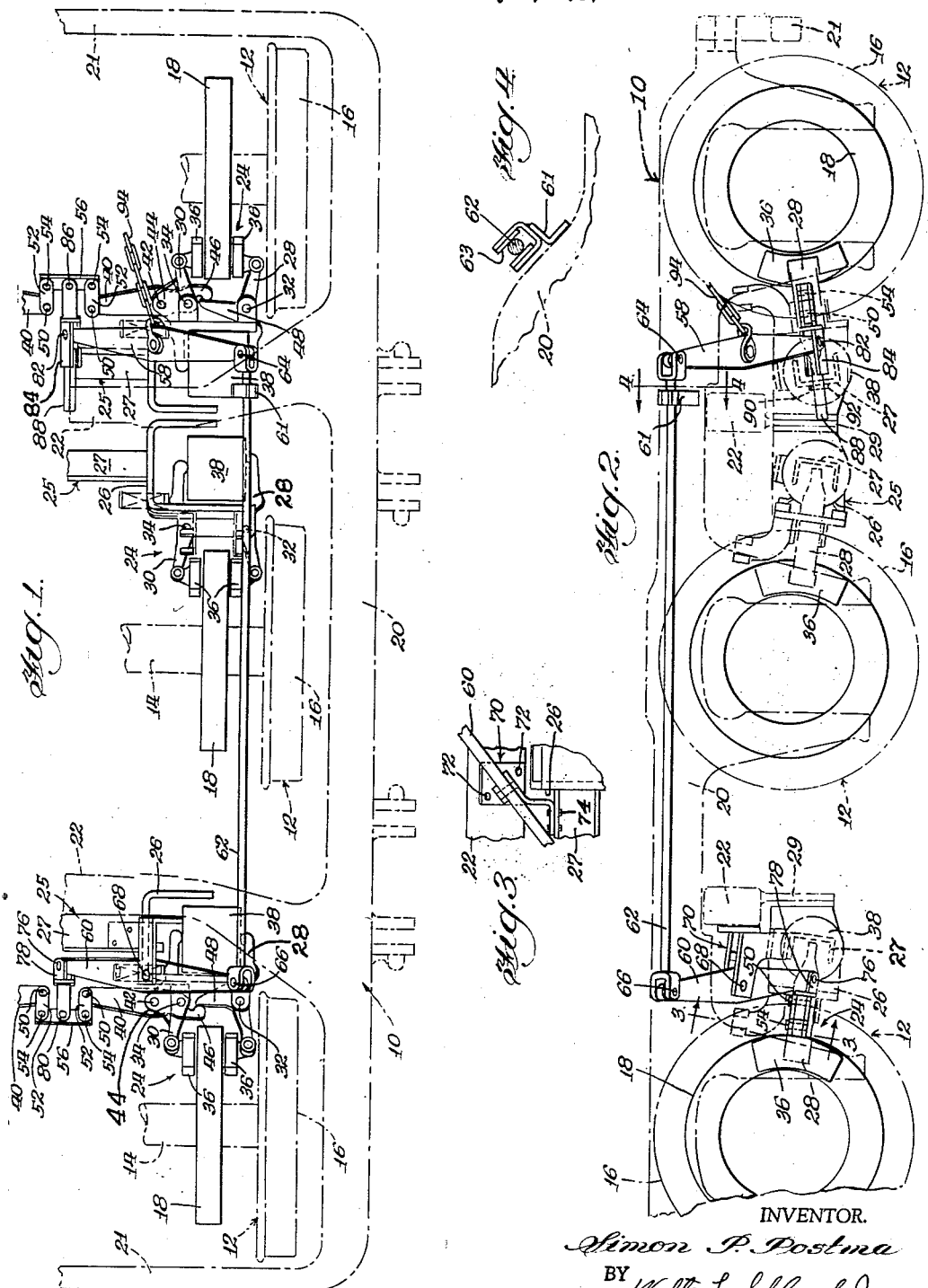
INVENTOR.
Simon P. Postma
BY Walter L. Schlegel, Jr.
Atty.
Witness:
Richard W. Carpenter

2,940,546

RAILWAY HAND BRAKE LINKAGE

Simon P. Postma, Highland, Ind., assignor to American Steel Foundries, Chicago, Ill., a corporation of New Jersey Filed May 7, 1957, Ser. No. 657,641

1 Claim. (Cl. 188—59)

This invention relates to hand brakes and more particularly to a hand brake linkage for a railway car truck brake arrangement.

The invention is concerned with the provision of a linkage system affording a means of interconnection between a plurality of normally power operated brake means mounted on a railway car truck and a mechanism for manually actuating the brake means which can be located in some convenient place on the railway car.

It is a primary object of this invention to provide a hand brake linkage arrangement that is simple in design and construction and relatively inexpensive to produce and maintain.

Another important object of this arrangement is to provide a hand brake linkage which may be readily applied to either a four-wheel or six-wheel railway car truck.

A further object is to provide a hand brake linkage which is especially suited for use in connection with a rotor brake arrangement.

Yet another object is the provision of a hand brake arrangement adapted to connect a plurality of independent brake means on a truck to a manual operating mechanism positioned at some convenient location on the car.

A more specific object of the invention is the provision of a hand brake linkage including a pair of live and dead levers operatively connected to each other and to respective pairs of separate rotor brake mechanisms disposed adjacent spaced wheel and axle assemblies.

These and other objects of the invention will be apparent from an examination of the following description and accompanying drawings, wherein:

Figure 1 is a fragmentary top plan view of a portion of a railway car truck to which has been applied a brake arrangement embodying features of my invention (only one-half of the arrangement is shown inasmuch as it is symmetrical with respect to the longitudinal vertical center plane of the truck);

Figure 2 is a fragmentary side elevational view of the structure shown in Figure 1;

Figure 3 is a fragmentary sectional view taken on line 3—3 of Figure 2; and

Figure 4 is a fragmentary sectional view taken on line 4—4 of Figure 2.

It will be understood that certain elements have been intentionally omitted from certain views where they are illustrated more clearly in other views.

Referring now to the drawings for a better understanding of the invention, it will be seen that the novel hand brake linkage arrangement is shown as applied to a six-wheel railway car truck comprising a truck frame indicated generally at 10 supported on three wheel and axle assemblies 12, each of which comprises an axle 14 having secured thereto a pair of wheels 16 and a pair of rotors 18 preferably spaced from each other at opposite ends of the assembly (only one wheel and rotor for each assembly is shown in the drawings).

The frame 10 preferably comprises a pair of spaced side rails or wheel pieces 20 (only one of which is shown) interconnected at their ends by a pair of end rails 21 and interconnected intermediate their ends by a pair of transoms 22.

The braking of each wheel and axle assembly 12 may be achieved by a pair of independent brake mechanisms, indicated generally at 24, disposed adjacent the rotors 18 of each assembly. Each pair of brake mechanisms is supported from the truck frame by a brake support, indicated generally at 25, comprising a pair of brake frames 26 interconnected by a transversely extending bar or beam 27. The brake frames may be connected to mounting brackets or flanges 29 which are rigidly secured to and which depend from the related transoms 22.

Inasmuch as the brake mechanisms are of conventional design and do not form a part of this invention they are not herein disclosed in complete detail. Each mechanism includes a pair of generally horizontally disposed outboard and inboard brake levers 28 and 30, respectively, fulcrumed intermediate their ends by pins 32 and 34, respectively, to the related brake frame 26. The outer ends of the brake levers of each brake mechanism 24 may be connected in any desired manner (not shown) to a pair of brake shoe assemblies 36 disposed on opposite sides of and engageable with the related rotor 18.

Automatic actuation of each brake mechanism is normally achieved by means of a duplex power cylinder 38 supported by brake frame 26 and disposed to engage corresponding inner ends of the respective brake levers.

Manual operation of the brake levers of each brake mechanism 24 may be achieved by a generally horizontally disposed hand brake actuating lever 40 pivotally connected intermediate its ends by pin 42 to an inboardly extending ear or lug 44 of inboard brake lever 30, and may also be pivotally connected to inboard brake lever 30 at a point outboardly of the first pivotal connection by means of common pivotal pin 34 which also serves to fulcrum the inboard brake lever to the frame as hereinbefore described. The outboard extremity of the hand brake actuating lever 40 is provided with a projection or nose 46 which is abuttably engageable with an inboardly extending ear or lug 48 on the outboard brake lever 28.

The inboard extremities of the actuating levers 40 of each pair of brake mechanisms 24 are pivotally connected by pins 50 to corresponding ends of a pair of links 52, the opposite ends of the links being pivotally connected by pins 54 to opposite ends of an equalizer bar 56.

As best seen in Figure 2 of the drawings, the brake mechanism 24 and related support 25 for the left-hand wheel and axle assembly is disposed inwardly of the assembly and supported from the left transom in the manner above described. The brake mechanisms and related supports for the center and right-hand wheel and axle assemblies are located between these assemblies and their respective supports 25 are mounted on opposite sides of a common bracket 29 which depends from and is secured to the related right-hand transom.

Although in the six-wheel truck illustrated in the drawings, each wheel and axle assembly is provided with a pair of brake mechanisms, as it is not usually necessary to apply the hand brake to all three assemblies, the hand brake linkage arrangement is shown as being connected to the brake mechanisms of only two of the wheel and axle assemblies.

The novel features of my invention reside in the actual linkage which serves to connect the normally power operated brake mechanisms 24 to a manually operated actuating device (not shown) which may be positioned at any convenient location on the railway car. This hand brake linkage comprises a pair of live and dead operating levers 58 and 60 respectively, which are interconnected by a pull rod 62 pivotally connected at its opposite ends by pins 64 and 66 to the upper ends of the respective operating levers. Additional support for pull rod 62 may be provided by a guide bracket 61 (as best seen in Figure 4) secured to the side rail 20 and presenting a slot 63 guidably receiving the pull rod.

Dead operating lever 60 may be fulcrumed intermediate its ends by pins 68 to a bracket 70 which, as best seen in Figure 3, is secured at its upper end by bolts 72 to transom 22 and its lower end by bolts 74 to beam 27 of support 25. At its lower end dead lever 60 may be pivotally connected by pin 76 to a clevis 78 which in turn is pivotally connected by pin 80 to the related equalizer bar 56 intermediate the ends of the bar.

The lower end of live operating lever 58 is pivotally connected by pin 82 to yoke or clevis 84 which in turn is pivotally connected by pin 86 to the adjacent equalizer bar 56. It will be seen that clevises 78 and 84 are not straight but each have one portion disposed at an angle relative to the other portion to accommodate the angled position of the operating levers which are inclined relative to the vertical. Dead lever fulcrum bracket 70 may also be designed to accommodate the inclined position of dead lever 60.

The yoke or clevis 84 for the live operating lever may be provided with a rearwardly extending rod 88 which is slidably received within an aperture 90 presented by adjacent beam 27 and which serves to guidably support the lower end of live operating lever 58. To prevent rapid wearing of the rod and enlargement of aperture 90, a washer or housing 92 may be secured to the beam adjacent the aperture to afford greater bearing surface for the rod.

An intermediate portion of live operating lever 58 may be connected to a chain or other connecting member 94 which in turn is connected to a manually operated hand brake lever or wheel mechanism (not shown) positioned at a convenient location on the car.

To describe the operation of my invention, it will be understood that as the hand operated mechanism (not shown) is actuated, chain 94 is moved to the right causing live operating lever 58 to pivot counterclockwise (as seen in Figure 2) about pivot 64 and thereby move related equalizer bar 56 and the inboard ends of associated actuating levers 40 to the right (as seen in Figure 1) which in turn causes the actuating levers to move the brake levers and brake shoe assemblies of their respective brake mechanisms into engagement with their related rotors.

As the right-hand brake mechanisms engage their respective rotors, the right-hand equilizer bar 56 stops moving and the fulcrum point of live lever 58 shifts from pivot 64 to pivot 82 and live lever 58 then begins to rotate clockwise (as seen in Figure 2) moving pull rod 62 and the upper end of dead lever 60 to the right. As the dead lever 60 rotates in a clockwise direction (as seen in Figure 2) about its fixed fulcrum point or pivot 68, related equalizer bar 56 is moved to the left and carries with it the inboard ends of the associating actuating levers 40, which in turn rotate to move the brake levers and brake shoe assemblies of their respective brake mechanisms into engagement with their related rotors.

I claim:

In a hand brake arrangement for a railway car truck having a truck frame and a pair of spaced wheel and axle assemblies each including a wheel and a brake rotor with surfaces adjacent the wheel and spaced therefrom; the combination of pairs of brake levers associated with respective rotors, brake means operatively connected to each pair of levers for braking the surfaces of the related rotor, hand brake levers pivoted to said frame operatively connected to respective pairs of said brake levers for actuation thereof, power cylinder devices operatively connected to respective pairs of said brake levers for actuation thereof, actuator levers having lower ends operatively connected to respective hand brake levers, said actuator levers extending diagonally outboardly and upwardly from said handbrake levers, and said actuator levers having their upper ends intersected by a vertical plane which extends parallel to the longitudinal vertical centerplane of the truck and which passes between the rotor and wheel of each assembly, fulcrum means on the frame for one of the actuator levers intermediate its ends, a pull rod having its longitudinal axis disposed within said plane, said pull rod interconnecting the upper ends of said actuator levers, said axis of said pull rod also being disposed within a horizontal plane which intersects said wheels, means on the frame supporting said rod adjacent its connection to the other actuator lever, and means connected to said other actuator lever between its ends for actuation thereof to apply the handbrake levers.

References Cited in the file of this patent
UNITED STATES PATENTS

| | | |
|---|---|---|
| 1,107,639 | Westlake | Aug. 18, 1914 |
| 1,504,281 | Streib | Aug. 12, 1924 |
| 1,531,284 | Hedgcock | Mar. 31, 1925 |
| 2,228,818 | Eksergian | Jan. 14, 1941 |
| 2,680,498 | Casey | June 8, 1954 |